United States Patent [19]

Tanaka et al.

[11] Patent Number: 5,424,138
[45] Date of Patent: Jun. 13, 1995

[54] COPPER-ALLOY SLIDE BEARING FOR LOW-RIGIDITY HOUSING AND METHOD FOR PRODUCING SAME

[75] Inventors: Tadashi Tanaka, Konan; Masaaki Sakamoto, Nagoya; Koichi Yamamoto, Komaki; Tsukimitsu Higuchi, Gifu, all of Japan

[73] Assignee: Daido Metal Co., Ltd., Nagoya, Japan

[21] Appl. No.: 141,060

[22] Filed: Oct. 26, 1993

[30] Foreign Application Priority Data

Jan. 19, 1993 [JP] Japan ................................. 5-006333

[51] Int. Cl.$^6$ ................................................ B22F 7/04
[52] U.S. Cl. ........................................ 428/553; 419/5; 419/8; 419/28; 419/55
[58] Field of Search ..................... 419/5, 8, 9, 50, 53, 419/54, 55, 56; 428/548, 553, 557; 384/912, 42, 624

[56] References Cited

U.S. PATENT DOCUMENTS

| | | | |
|---|---|---|---|
| 2,198,254 | 4/1940 | Koehring | 428/553 |
| 4,818,628 | 4/1989 | Alexander et al. | 428/561 |
| 4,916,026 | 4/1990 | Bergmann et al. | 428/555 |
| 4,978,587 | 12/1990 | Mori et al. | 428/645 |
| 4,999,257 | 3/1991 | Imai | 428/555 |
| 5,041,339 | 8/1991 | Mori et al. | 428/552 |
| 5,074,458 | 12/1991 | Tanaka et al. | 228/232 |
| 5,075,177 | 12/1991 | Tanaka et al. | 428/653 |
| 5,185,216 | 2/1993 | Tanaka et al. | 428/614 |

FOREIGN PATENT DOCUMENTS

| | | | |
|---|---|---|---|
| 3-177598 | 10/1991 | Japan | C25D 7/10 |
| 3-281704 | 3/1992 | Japan | B22F 7/04 |
| 2243418 | 4/1991 | United Kingdom | |
| 2253016 | 2/1992 | United Kingdom | |

Primary Examiner—Donald P. Walsh
Assistant Examiner—John N. Greaves
Attorney, Agent, or Firm—Browdy and Neimark

[57] ABSTRACT

A copper-alloy slide bearing for a low-rigidity housing having a three-layer structure of a steel back-metal, a copper-alloy layer and an overlay, the back metal containing 0.03 to 0.26% by weight of carbon. During the production of the slide bearing, a bimetal is prepared in such a manner that a back-metal portion is rolled at a total rolling reduction of 10 to 35%, and the resultant bimetal is heat-treated at a relatively low temperature, so that the slide bearing includes a back metal having a 0.01% elastic limit of not less than 300 N/mm$^2$. When the copper-alloy slide bearing is used in a low-rigidity housing of an internal combustion engine, the slide bearing is capable of more excellently following the deformation of the housing, as well as capable of providing more excellent intimate contact and more excellent fretting resistance, than a conventional multi-layer slide bearing.

2 Claims, No Drawings

COPPER-ALLOY SLIDE BEARING FOR LOW-RIGIDITY HOUSING AND METHOD FOR PRODUCING SAME

BACKGROUND OF THE INVENTION

1. Field of the Invention

The present invention relates to a slide bearing, and particularly, to a slide bearing capable of providing sufficient performance when used in a housing which has recently come to be formed by use of aluminum in order to reduce the level of fuel consumption and the weight of internal combustion engines, and which has also come to be subjected to increased force of inertia as internal combustion engines have been adapted to achieve higher speeds or greater numbers of revolutions per unit time.

2. Description of the Related Art

A conventional slide bearing for use in an internal combustion engine comprises a steel back-metal layer, a copper-alloy layer and a lead-alloy overlay. Known examples of materials for forming the copper-alloy layer include Cu—Pb alloys and Cu—Sn—Pb alloys. Known examples of materials for forming the lead-alloy overlay include Pb—Sn alloys, Pb—Sn—Cu alloys, and Pb—Sn—In alloys.

Regarding materials for forming the steel back-metal, low carbon steels containing not more than 0.20% by weight of carbon have been normally used. Almost all such conventional steel back-metals have a 0.01% elastic limit of non more than 300 N/mm².

In recent years, in an internal combustion engine, engine blocks, connecting rods, etc. have increasingly been made by using aluminum alloys. Thus, the housing of an internal combustion engine has come to be formed by use of aluminum alloys. As a result, the housing is more likely to deform than conventional housings made of cast iron, carbon steel or alloy steel when subjected no force of inertia during a high-load operation of the engine or an operation thereof with a great number of revolutions per unit time. Deformation of the housing impairs tight contact between the housing and a bearing, thereby causing fretting (surface damage occurring when slight relative movement is repeated between two faces contacted each other) or migration (local concentration of Cu plating, flash plating and/or carbide which local concentration occurs due to the repetition of relative movement), which may in turn cause damages, such as fatigue or seizure, or unwanted co-rotation with a shaft. In order to avoid these risks, it is necessary to form the steel back-metal of the bearing with a hard, high strength material, and to employ an large interference when assembling the bearing onto the housing, to thereby improve the tight-contact ability of the bearing.

However, a conventional back-metal made of a low carbon steel cannot have sufficient strength in a case where the back-metal is subjected to only rolling during the preparation a bimetal for the bearing. On the other hand, when a slide bearing is assembled on a housing with an increased interference, the bearing may be subjected to stress exceeding its elastic limit, resulting in permanent strain in the bearing. Thus, it has not been possible to achieve sufficiently satisfactory results.

SUMMARY OF THE INVENTION

An object of the present invention is to provide a copper-alloy slide bearing comprising a highly elastic back-metal which makes the bearing capable of coping with a low-rigidity in a housing, typically formed of an aluminum block, that is, renders the bearing capable of excellently following deformation of such a housing.

The present invention provides a copper-alloy slide bearing comprising a highly elastic back-metal so as to be capable of coping with a low-rigidity housing of an internal combustion engine. The gist of the present invention lies in the following:

① A copper-alloy slide bearing for a low-rigidity housing, the slide bearing having a three-layer structure comprising: a steel back-metal; a copper-alloy layer; and an overlay, the steel back-metal comprising either a non-plated steel back-metal or a steel back-metal plated with copper, the steel back-metal having 0.01% elastic limit of not less than 300 N/mm².

② In the slide bearing recited in Item ①, the steel back-metal contains carbon in an amount of 0.03 to 0.26% by weight.

③ A slide bearing of the type recited in Item ① or Item ② comprises a copper-alloy layer bonded to the steel back-metal and having a chemical composition consisting of: 15 to 30% by weight of lead (Pb); 0.5 to 8% by weight of tin (Sn); and the balance of copper (Cu) and incidental impurities.

④ A slide bearing of the type recited in any of Items ① to ③ may include an overlay bonded to the copper-alloy layer and having a chemical composition consisting of: 3 to 18% by weight of tin (Sn); at least one component selected from the group consisting of not more than 15% by weight of indium (In) and not more than 3% by weight of copper (Cu); and the balance of lead (Pb) and incidental impurities.

⑤ A method for producing a copper-alloy slide bearing for a low-rigidity housing of the type recited in any of Items ① to ④ comprises the steps of: preparing a bimetal by forming a composite material comprising a steel back-metal portion and a copper alloy powder spreaded on the steel back-metal portion, and repeatedly sintering and rolling the composite material with a total rolling reduction ratio of 10 to 35% being applied to the back-metal portion; and heat-treating the resultant bimetal at a temperature of 50° to 400° C. so that the slide bearing comprises a steel back-metal having a 0.01% elastic limit of not less than 300 N/mm².

The reasons for the specifying the numerical limitations shown above are as follows:

(1) Steel Back-Metal (a) 0.01% elastic limit: non less than 300 N/mm²

If the steel back-metal has a 0.01% elastic limit of less than 300 N/mm², yield may occur in the bearing when the bearing is assembled onto the relevant housing with a large interference, thereby impairing tight contact between the bearing and the housing.

(b) carbon content: 0.03 to 0.26% by weight

If the steel back-metal contains carbon in an amount of less than 0.03% by weight (hereinafter abbreviated to "wt %"), it becomes impossible to enhance the elastic limit during heat treatment. A carbon content in the steel back-metal exceeding 0.26 wt % is disadvantageous in that the repetition times of rolling steps of the bimetal becomes increased, thereby increasing production costs, and that inferior workability is caused regarding the pressing and machining of the bimetal.

(2) Copper-Alloy Layer (a) lead (Pb) content: 15 to 30 wt %

A copper-alloy layer containing less than 15 wt % of Pb degrades resistance to seizure, and embedding ability. A Pb content in the copper-alloy layer exceeding 30 wt % degrades both the strength of the alloy and resistance to fatigue.

(b) tin (Sn) content: 0.5 to 8 wt %

A copper-alloy layer containing less than 0.5 wt % of Sn causes insufficient strength. A Sn content in the copper-alloy layer exceeding 8 wt % lowers both thermal conductivity and resistance to seizure.

(3) Overlay (a) Sn content: 3 to 18 wt %

An overlay containing less than 3 wt % of Sn causes both insufficient strength of the alloy and inferior resistance to corrosion. A Sn content in the overlay exceeding 18 wt % lowers the melting point of the alloy, thereby causing higher risk of a wiping phenomenon (a melt flow phenomenon).

(b) indium (in) content: not more than 15 wt %

Indium improves wear resistance and corrosion resistance. However, an In content in the overlay exceeding 15 wt % lowers the melting start temperature, thereby causing higher risk of a wiping phenomenon.

(c) Copper (Cu) content: not more than 5%

Cu improves wear resistance and fatigue resistance. However, a Cu content in the overlay exceeding 5 wt % makes the overlay so hard that it becomes brittle.

(4) Total Rolling Reduction for Back-Metal Portion: 10 to 35%

Employing of a total rolling reduction less than 10% for a back-metal portion makes it impossible to assure a 0.01% elastic limit of not less than 300 N/mm² after heat treatment. A total rolling reduction exceeding 35% lowers the mechanical strength of the alloy.

(5) Heat Treatment Temperature: 150° to 400° C.

A heat treatment temperature of less than 150° C. is not effective to increase 0.01% elastic limit. A heat treatment temperature exceeding 400° C. degrades the mechanical strength of the alloys.

DESCRIPTION OF THE PREFERRED EMBODIMENTS

The present invention will now be described by examples.

Examples

Bimetals for comparison examples were prepared by a method comprising the steps of: spreading on each of steel back-metals (steel type: JIS SPCC which indicates a cold rolled steel sheet containing carbon not less than 0.20%) having the chemical compositions shown in Table 1 a Cu—Sn 3.5%-Pb 23% alloy powder (an alloy powder for forming a copper-alloy layer) having a grain size of not more than 250 µm; sintering the materials at a temperature of 700° to 900° C. in a reducing atmosphere for a period of 10 % to 30 minutes; rolling the sintered materials by making them mass through rolls; sintering the resultant materials again (at a temperature of 700° to 900° C. for 10 to 30 minutes), and rolling them again, thereby preparing bimetals (Nos. 9 to 12 shown in Table 1) for comparison examples. Bimetals for producing bearings according to the present invention were prepared in the same seeps (from the spreading of the powder to the rolling) as above except that the back-metal portion of each material was subjected to rolling at a total rolling reduction of 10 to 30%. Thereafter, the resultant bimetals for bearings according to the present invention were heat-treated at a temperature of 150° to 300° C. for 30 to 60 minutes, thereby preparing bimetals (Nos. 1 to 8 shown in Table 1) according to the present invention, each bimetal having a steel back-metal with a thickness of 1.3 to 1.8 mm and a copper-alloy layer with a thickness of 0.2 to 0.5 mm. The above re-rolling may, of course, be repeated a plurality of times as needed. Table 1 shows, in addition to the back-metal components, the following data on the bimetals: the total rolling reduction for the back-metal portions; heat-treatment temperatures; the hardness, the tensile strength and the 0.01% elastic limits of the steel back-metals of the bimetals; and the hardness of the copper-alloy layers of the bimetals.

Some of the thus prepared bimetals according to the present invention (Nos. 2, 4 and 5 shown in Table 2) and some of the comparison bimetals (Nos. 9, 10 and 12 shown in Table 2) were each pressed and machined into a semi-circular shape, and each was then plated by a usual electroplating method with an overlay having a chemical composition of Pb—Sn 9 wt%-In 9 wt % the overlay having a thickness of 10 to 30 µm, thereby producing bearings according to the present invention and comparison bearings. Each of the bearings was subjected to fretting resistance tests on an actual machine by applying a bearing stress of 25 to 30 kgf/mm². The results of the tests are shown in Table 2. Further, each of the above bimetals according to the present invention (Nos. 2, 4 and 5 shown in Table 3) and the comparison bimetals (Nos. 9, 10 and 12 shown in Table 3) was machined into a cylindrical bearing, and assembled onto an aluminum housing by pressure-fitting the bearing. The bearings were subjected to heat-cycle tests in order to check the amounts of permanent strain in each of the back-metals. In these tests, ten cycles, each comprising a sub-cycle at normal temperature and a sub-cycle at 40° C., were effected, each sub-cycle having a retention period of 1 hour. The results of the heat-cycle tests were evaluated by measuring, as an amount of permanent strain in each bearing, the difference between the outer diameter of the bearing before pressure-fitting and the outer diameter that the bearing had when it was removed from the relevant housing after the completion of the heat-cycle tests. The thus obtained results are also shown in Table 3.

As shown in Table 2, while fretting damages occurred in all the comparison bearings subjected to the fretting resistance tests (i.e., those bearings including comparison bimetals Nos. 9, 10 and 12), no fretting damages were observed in the bearings according to the present invention (i.e., those including bimetals Nos. 2, 4 and 5). This difference is attributable to the fact that the bearings according to the present invention include back-metals having high strength, and possess excellent ability to absorb or elastically follow the deformation of the relevant housings. Further, as will be clear from the results shown in Table 3, the bearings according to the present invention have smaller amounts of permanent strain than the comparison bearings. Thus, a bearing according to the present invention is capable of more excellently following the deformation of the relevant housing, as well as capable of providing more excellent tight contact, than a comparison bearing.

In brief, a copper-alloy slide bearing according to the present invention is obtained by production in which particular conditions are employed to effect rolling with a relatively high rolling reduction ratio, and then effect heat-treatment at relatively low temperature, so that the resultant steel back-metal has particular mechanical properties, in particular, a 0.01% elastic limit of not less than 300 N/mm². Accordingly, when the bearing is used in a low-rigidity aluminum housing, the bearing according to the present invention is able to more excellently following the deformation of the relevant housing, as well as able to provide more excellent tight contact and more excellent fretting resistance, than a conventional multi-layer bearing.

TABLE 1

| No. | Back-metal components (wt %) | | | Total rolling reduction ratio for back-metal portion (%) | Heat-treatment temperatures (°C.) | Back metal | | | Vickers hardness of copper-alloy layer (HV5) |
| --- | --- | --- | --- | --- | --- | --- | --- | --- | --- |
| | C | Mn | Fe | | | Vickes hardness (HV10) | Tensile strength (N/mm²) | 0.01% elastic limit (N/mm²) | |
| 1 | 0.19 | 0.68 | Balance | 10 | 250 | 175 | 534 | 453 | 82 |
| 2 | 0.19 | 0.68 | Balance | 30 | 250 | 236 | 655 | 533 | 90 |
| 3 | 0.11 | 0.40 | Balance | 20 | 250 | 176 | 515 | 349 | 88 |
| 4 | 0.11 | 0.40 | Balance | 27 | 250 | 195 | 564 | 353 | 89 |
| 5 | 0.05 | 0.29 | Balance | 11 | 250 | 148 | 418 | 313 | 80 |
| 6 | 0.05 | 0.29 | Balance | 27 | 250 | 174 | 517 | 399 | 89 |
| 7 | 0.19 | 0.68 | Balance | 10 | 150 | 165 | 510 | 430 | 83 |
| 8 | 0.19 | 0.68 | Balance | 12 | 300 | 178 | 540 | 460 | 81 |
| 9 | 0.19 | 0.68 | Balance | 6 | Not effected | 146 | 451 | 266 | 80 |
| 10 | 0.11 | 0.40 | Balance | 6 | Not effected | 124 | 386 | 224 | 80 |
| 11 | 0.11 | 0.40 | Balance | 9 | Not effected | 137 | 420 | 264 | 85 |
| 12 | 0.05 | 0.29 | Balance | 11 | Not effected | 131 | 385 | 258 | 87 |

TABLE 2

| No. | Results of tests on actual machine |
| --- | --- |
| 2 | No fretting damage occurred |
| 4 | No fretting damage occurred |
| 5 | No fretting damage occurred |
| 9 | Fretting damage occurred |
| 10 | Fretting damage occurred |
| 12 | Fretting damage occurred |

TABLE 3

| No. | Bearing outer diameter (mm) | | Amount of permanent strain (μm) |
| --- | --- | --- | --- |
| | Before tests | after tests | |
| 2 | 39.175 | 39.158 | 17 |
| 4 | 39.175 | 39.156 | 19 |
| 5 | 39.174 | 39.154 | 20 |
| 9 | 39.174 | 39.132 | 42 |
| 10 | 39.175 | 39.133 | 48 |
| 12 | 39.174 | 39.130 | 44 |

What is claimed is:

1. A copper-alloy slide bearing for a low-rigidity housing, said slide bearing having a three-layer structure comprising:
a steel back-metal; a copper-alloy layer; and an overlay, said steel back-metal layer comprising either a non-plated steel back-metal or a steel back-metal plated with copper,
said steel back-metal containing carbon in an amount of 0.03 to 0.26% by weight, and having a 0.01% elastic limit of not less than 300 N/mm², said steel back-metal having been rolled to a total rolling reduction of 10% to 35% and heat treated at 150°–400° C. to increase its 0.01% elastic limit;
wherein said copper-alloy layer is bonded to said steel back-metal, and has a chemical composition consisting of: 15 to 30% by weight of lead; 0.5 to 8% by weight of tin; and the balance of copper and incidental impurities; and
wherein said overlay is bonded to said copper-alloy layer, and has a chemical composition consisting of: 3 to 18% by weight of tin; at least one component selected from the group consisting of not more than 15% by weight of indium and not more than 3% of copper; and the balance of lead and incidental impurities.

2. A method for producing a copper-alloy slide bearing for a low-rigidity housing, said slide bearing being of the type recited in claim 1, said method comprising the steps of:
providing a copper-lead-tin alloy powder consisting essentially of: 15 to 30% by weight of lead; 0.5 to 8% by weight of tin; and the balance of copper and incidental impurities;
spreading said copper-lead-tin alloy powder on a steel back-metal to thereby provide a composite material, and repeatedly sintering and rolling said composite material with a total rolling reduction of 10 to 35% applied to said steel back-metal to thereby obtain a bimetal;
heat-treating the resultant bimetal at a temperature of 150° to 400° C. so that said slide bearing includes a steel back-metal having a 0.01% elastic limit of not less than 300 N/mm²; and
plating said copper alloy layer with an overlay consisting essentially of 3 to 18% by weight of tin, at least one component selected from the group consisting of not more than 15% by weight of indium and not more than 3% by weight of copper, and the balance of lead and incidental impurities.

* * * * *